(12) United States Patent
Kunkel et al.

(10) Patent No.: US 8,876,193 B2
(45) Date of Patent: Nov. 4, 2014

(54) INNER WALL LINER FOR A REFRIGERATED TRAILER WALL PANEL

(75) Inventors: David P. Kunkel, Lebanon, IN (US); Patrick M. Griffin, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 105 days.

(21) Appl. No.: 13/547,145

(22) Filed: Jul. 12, 2012

(65) Prior Publication Data

US 2013/0020831 A1 Jan. 24, 2013

Related U.S. Application Data

(60) Provisional application No. 61/509,762, filed on Jul. 20, 2011.

(51) Int. Cl.
*B62D 33/04* (2006.01)
*B21D 53/88* (2006.01)

(52) U.S. Cl.
CPC .............. *B21D 53/88* (2013.01); *B62D 33/048* (2013.01)
USPC ..................................... 296/186.1; 296/181.6

(58) Field of Classification Search
CPC .... B62D 33/04; B62D 33/044; B62D 33/046; B62D 33/048
USPC ........................................... 296/181.6, 186.1
See application file for complete search history.

(56) References Cited

U.S. PATENT DOCUMENTS

| | | |
|---|---|---|
| 3,419,447 A | 12/1968 | Hewitt |
| 4,357,047 A | 11/1982 | Katz |
| 4,892,774 A | 1/1990 | Vallance |
| 5,219,629 A | 6/1993 | Sobolev |
| 5,509,714 A | 4/1996 | Schmidt |
| 5,992,117 A * | 11/1999 | Schmidt ..................... 296/186.1 |
| 6,220,651 B1 | 4/2001 | Ehrlich |
| 6,505,883 B1 | 1/2003 | Ehrlich |
| 6,652,018 B2 | 11/2003 | Buchhold et al. |
| 6,977,113 B2 | 12/2005 | Kody |
| 7,014,253 B2 | 3/2006 | Oren |
| 7,461,888 B2 | 12/2008 | Brown |
| 7,478,865 B2 | 1/2009 | Klein |
| 2002/0098053 A1 | 7/2002 | Zubko |
| 2002/0148196 A1 | 10/2002 | Barry et al. |
| 2003/0080586 A1 | 5/2003 | Ehrlich |
| 2004/0232728 A1 | 11/2004 | Smidler |
| 2005/0042432 A1 | 2/2005 | Jones et al. |
| 2005/0042433 A1 | 2/2005 | Jones et al. |
| 2006/0019078 A1 | 1/2006 | Osten et al. |

(Continued)

OTHER PUBLICATIONS

US Office Action, U.S. Appl. No. 12/505,990 dated Apr. 14, 2010 (8 pages).
US Office Action, U.S. Appl. No. 12/505,990 dated Oct. 6, 2010 (11 pages).

(Continued)

*Primary Examiner* — Jason S Morrow

(57) ABSTRACT

An inner wall liner of a wall panel of a refrigerated trailer includes a liner sheet formed of fiber reinforced plastic (FRP) and a scuff plate formed of FRP. The scuff plate and the liner sheet are fused together such that the scuff plate is coupled to a bottom portion of the liner sheet. The inner liner further includes an upper wall plate formed of FRP. The upper wall plate and the liner sheet are fused together such that the upper wall plate is coupled to an upper portion of the liner sheet.

15 Claims, 2 Drawing Sheets

(56) References Cited

U.S. PATENT DOCUMENTS

| | | | |
|---|---|---|---|
| 2006/0043771 A1* | 3/2006 | Ehrlich | 296/186.1 |
| 2007/0110944 A1 | 5/2007 | Grandominico et al. | |
| 2007/0163193 A1* | 7/2007 | Jones et al. | 52/309.1 |
| 2007/0194602 A1* | 8/2007 | Ehrlich | 296/186.1 |
| 2009/0206631 A1* | 8/2009 | Lewallen et al. | 296/186.1 |
| 2009/0278386 A1 | 11/2009 | Ehrlich | |

OTHER PUBLICATIONS

Two page brochure for the Sonics 40kHz Ultrasonic Plastics Welding System Models 4095/4096, manufactured by Sonics & Materials, Inc. Copyright 2005.

Prosecution History of U.S. Appl. No. 11/355,053, filed Feb. 15, 2006; Inventors: Gary Alan Grandominico; Raymond A. McDonald, Jr.; and Dominic Plauche Grandominico.

* cited by examiner

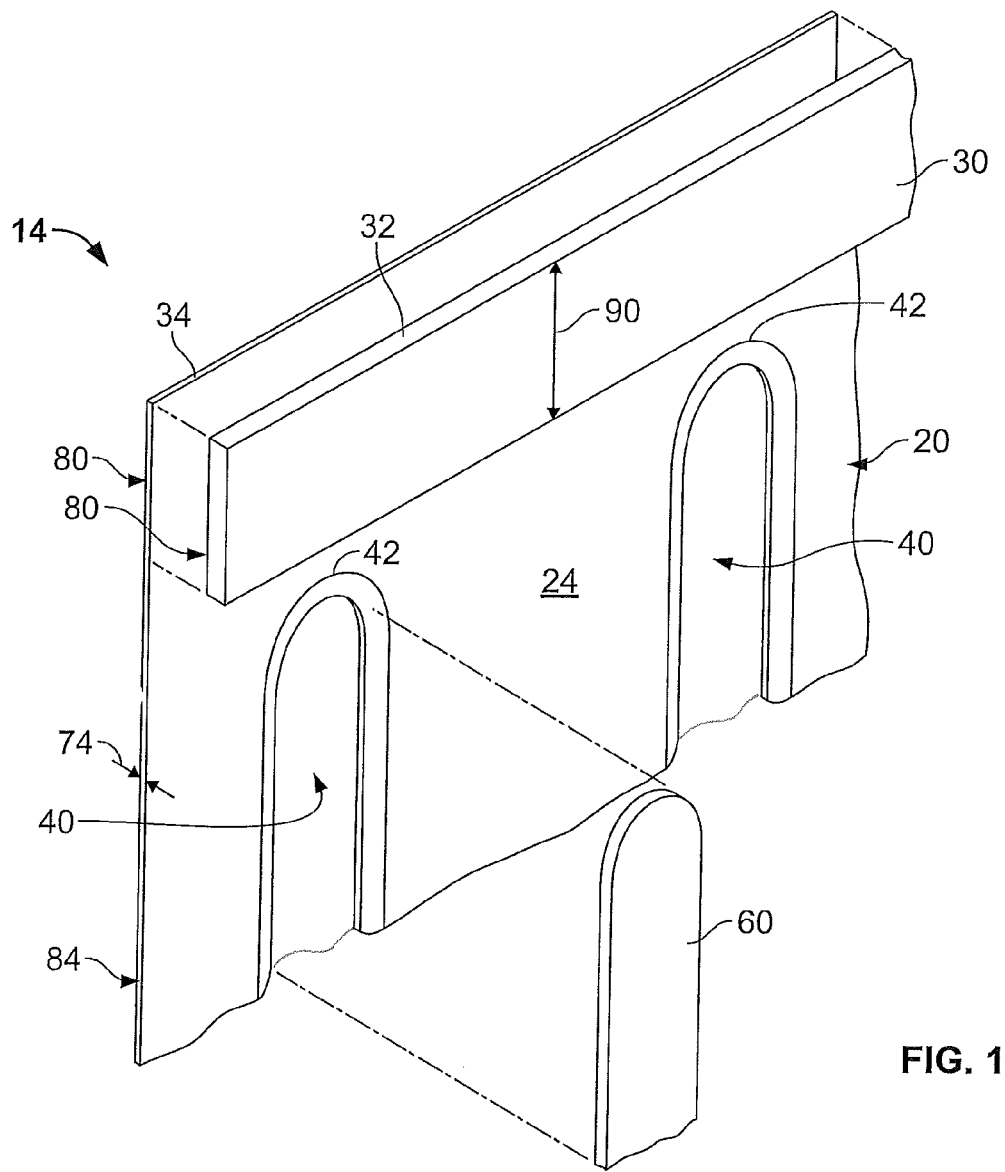
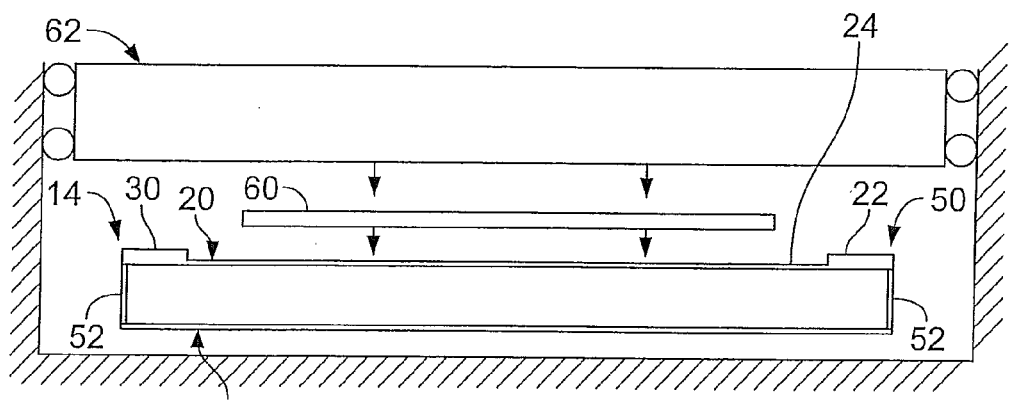

INNER WALL LINER FOR A REFRIGERATED TRAILER WALL PANEL

This application claims priority under 35 U.S.C. §119(e) to U.S. Provisional Patent Application Ser. No. 61/509,762 filed Jul. 20, 2011 entitled INNER WALL LINER FOR A REFRIGERATED TRAILER WALL PANEL, the entirety of which is hereby incorporated by reference herein.

Cross-reference is herein made to U.S. Utility Patent Application Publication No. 2009/0278386 filed Jul. 20, 2000 entitled FUSED THERMOPLASTIC SCUFF AND WALL PLATE, the entirety of which is hereby incorporated by reference herein.

FIELD OF THE INVENTION

The present invention relates generally to a wall panel for a refrigerated trailer. In particular, the present invention relates to the inner wall liner of the wall panel of a refrigerated trailer.

BACKGROUND

The inner wall liner of a wall panel of a refrigerated trailer oftentimes includes a bottom scuff plate which extends along a length of the trailer and is located at a bottom edge of the inner wall liner. The scuff plate is provided to prevent forklifts, cargo, and other things being moved in and out of the refrigerated trailer from damaging the inner wall liner of the wall panel.

The inner wall liner of a refrigerated trailer may also include vertical indentations, or recessed cavities, formed therein. These vertically-extending recessed cavities are configured to receive a logistics track therein such that the logistics track, once coupled to the inner wall liner, is generally flush with the inner surface of the inner wall liner.

SUMMARY

The present invention may comprise one or more of the features recited in the attached claims, and/or one or more of the following features and combinations thereof.

According to one aspect of the present disclosure, an inner wall liner of a wall panel of a refrigerated trailer includes a liner sheet formed of fiber reinforced plastic (FRP) and a scuff plate formed of FRP. The scuff plate and the liner sheet are fused together such that the scuff plate is coupled to a bottom portion of the liner sheet. The inner liner further includes an upper wall plate formed of FRP. The upper wall plate and the liner sheet are fused together such that the upper wall plate is coupled to an upper portion of the liner sheet.

In one illustrative embodiment, the scuff plate and the upper wall plate may each be coupled to an inner surface of the liner sheet.

In another illustrative embodiment, a thickness of the scuff plate and a thickness of the upper wall plate may be substantially the same. Alternatively, a thickness of the scuff plate may be different from a thickness of upper wall plate.

In still another illustrative embodiment, the liner sheet may include a plurality of cavities formed therein. Each cavity may be configured to receive a logistics track. Illustratively, the cavities may be formed in an inner surface of the liner sheet. A top edge of each cavity may be spaced-apart from the upper wall plate and a bottom edge of each cavity may be spaced-apart from the lower scuff plate.

In yet another illustrative embodiment, the scuff plate and upper wall plate may be coupled to the inner surface of the liner sheet without the use of fasteners or adhesives. Further illustratively, the inner wall liner may be substantially homogenous.

According to another aspect of the present disclosure, an inner wall liner of a wall panel of a refrigerated trailer includes an upper portion configured to extend along a length of the trailer, a lower portion configured to extend along a length of the trailer, and a middle portion configured to extend along a length of the trailer. The upper portion defines a first thickness. The lower portion defines a second thickness, and the middle portion defines a third thickness. The third thickness is less than both the first thickness and the second thickness.

In one illustrative embodiment, the first thickness may be generally equal to the second thickness. Alternatively, the first thickness may be different from the second thickness.

In another illustrative embodiment, the upper portion may define a first height smaller than a second height of the lower portion.

In still another illustrative embodiment, the middle portion may include a vertically-extending cavity formed in an inner surface of the middle portion. Illustratively, the vertically-extending cavity may include an upper edge spaced-apart from the upper portion and a lower edge spaced apart from the lower portion.

In yet another illustrative embodiment, the inner wall liner may be made from a fiber reinforced plastic (FRP) such that the upper, lower, and middle portions of the inner wall liner are each made from FRP.

In still another illustrative embodiment, an outer surface of the inner wall liner may be generally planar. Further, an inner surface of the upper portion of the inner wall liner may be parallel to and spaced-apart from an inner surface of the middle portion of the inner wall liner.

In yet another illustrative embodiment, the inner wall liner may be substantially homogenous.

According to still another aspect of the present disclosure, a method of making a wall panel of a refrigerated trailer includes forming an inner wall liner to include an upper portion, a middle portion, and a lower portion. The upper portion and the lower portion are each thicker than the middle portion. The method also includes placing the inner wall liner and an outer sheet of the wall panel into a platform area such that the outer sheet and the inner wall liner are spaced-apart from each other. The method further includes positioning a form on an inner surface of the middle portion of the inner wall liner such that the form is spaced-apart from the upper portion and the lower portion of the inner wall liner, and lowering a platen onto the form. The method further includes injecting an expanding foam into a space between the inner wall liner and the outer sheet in order to force the inner surface of the middle portion of the inner liner sheet into full contact with the platen in order to create a recessed cavity where the form is positioned.

In one illustrative embodiment, forming the inner wall liner may include extruding a liner sheet, extruding an upper wall plate, extruding a bottom scuff plate, coupling the upper wall plate to an upper portion of the liner sheet, and coupling the bottom scuff plate to a lower portion of the liner sheet. Illustratively, the liner sheet, upper wall plate, and bottom scuff plate may be made from a fiber reinforced plastic (FRP). Further illustratively, coupling the upper wall plate to the upper portion of the liner sheet may include fusing the upper wall plate to the upper portion of the liner sheet, and coupling the bottom scuff plate to the lower portion of the liner sheet may include fusing the bottom scuff plate to the lower portion of the liner sheet.

BRIEF DESCRIPTION OF THE DRAWINGS

FIG. 1 is an exploded, perspective view of approximately an upper half of an inner wall liner of a wall panel for a refrigerated trailer.

FIG. 2 is a side, schematic view of the inner wall liner of FIG. 1 and an outer sheet of the wall panel within a press area and configured to have an expanding foam inserted into a cavity between the inner wall liner and the outer sheet in order to form the wall panel of the refrigerated trailer.

DESCRIPTION OF THE ILLUSTRATIVE EMBODIMENTS

Figure 3:
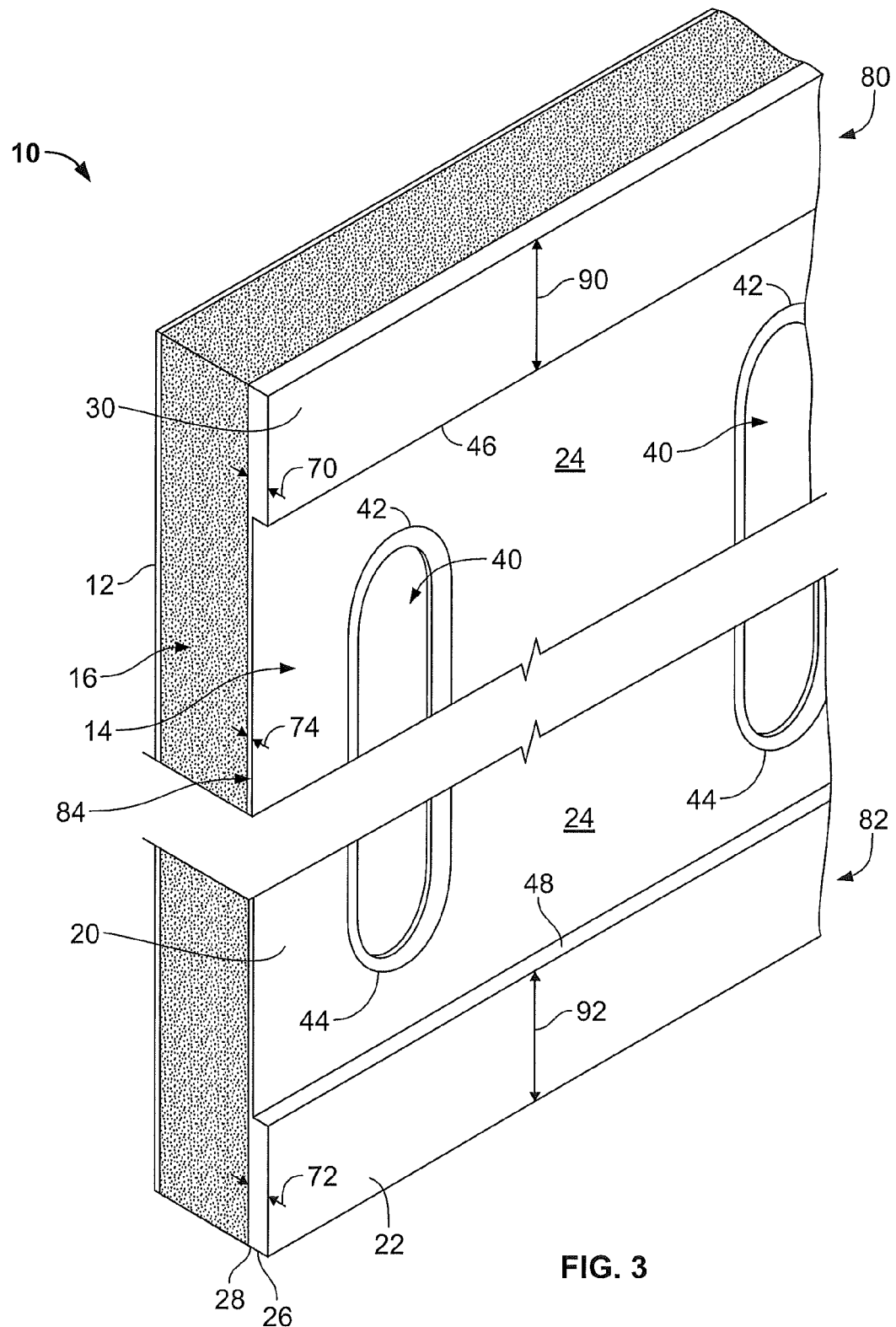
FIG. 3 is a perspective view of the wall panel for a refrigerated trailer showing the inner wall liner including a bottom scuff plate coupled to an inner surface and extending along a bottom edge thereof, and an upper wall plate coupled to the inner surface and extending along an upper edge thereof.

For the purposes of promoting an understanding of the principles of the invention, reference will now be made to illustrative embodiments shown in the attached drawings and specific language will be used to describe the same. While the concepts of this disclosure are described in relation to a truck trailer, and particularly to a refrigerated truck trailer, it will be understood that they are equally applicable to other mobile or stationary storage containers, as well as refrigerated and un-refrigerated trailers or storage containers. Accordingly, those skilled in the art will appreciate that the present invention may be implemented in a number of different applications and embodiments and is not specifically limited in its application to the particular embodiments depicted herein.

Looking to FIG. 3, a wall panel 10 of a refrigerated truck trailer (not shown) includes an outer sheet 12, an inner wall liner 14, and a foam core 16 coupled to and positioned between the outer sheet 12 and the inner wall liner 14. Illustratively, the outer sheet 12 may be any suitable outer sheet typically used with insulated wall panels for truck trailers. The outer sheet 12 is illustratively made from metal, but may be made from other suitable materials as well. The foam core 16 is illustratively made from an expanding polymer, but may be made from other suitable, insulating materials as well.

The inner wall liner 14 of the present disclosure includes a liner sheet 20 illustratively made from a fiber reinforced plastic (FRP) and extends along a both a length of the trailer and a height of the trailer. The inner wall liner 14 further includes a bottom scuff plate 22 coupled to an inner surface 24 of the liner sheet 20. Illustratively, the bottom scuff plate 22 extends along a length of the trailer and is coupled to a bottom portion of the liner sheet 20 such that a bottom edge 26 of the scuff plate 22 and a bottom edge 28 of the liner sheet 20 are generally aligned. Illustratively, the scuff plate 22 is made from the same material as the liner sheet 20 and is fused to the liner sheet 20, as is discussed, for example, in U.S. Patent Application Publication Serial No. 2009/0278386, titled FUSED THERMOPLASTIC SCUFF AND WALL PLATE, the entirety of which is hereby incorporated by reference herein. It should be understood, however, that the scuff plate 22 may be made of other suitable materials and may be coupled to the liner sheet 20 in another suitable manner using, for example, mechanical fasteners and/or adhesives.

The inner wall liner 14 further includes an upper wall plate 30 coupled to the inner surface 24 of the liner sheet 20. Illustratively, the upper wall plate 30 extends along a length of the trailer and is coupled to an upper portion of the liner sheet 20 such that an upper edge 32 of the upper wall plate 30 and an upper edge 34 of the liner sheet 20 are generally aligned, as shown in FIGS. 1 and 3. Illustratively, the upper wall plate 30 is made from the same material as the liner sheet 20 and is fused to the liner sheet 20 in the same manner as that discussed above in regard to the scuff plate 22. It should be understood, however, that the upper wall plate 30 may be made of other suitable materials and may be coupled to the liner sheet 20 in another suitable manner using, for example, mechanical fasteners and/or adhesives.

Illustratively, the inner wall liner 14 further includes vertically-extending recessed portions or cavities 40 formed in the inner surface 24 of the liner sheet 20. The vertically-extending recessed portions 40 are configured to receive a logistics track (not shown) therein such that the logistics track, once coupled to the liner sheet 20, is generally flush with the inner surface 24 of the liner sheet 20 and does not substantially extend into the interior of the trailer beyond the inner surface 24 of the liner sheet 20. The logistics tracks may be coupled to the liner sheet 20 in any suitable manner including the use of mechanical fasteners, such as rivets, and/or the use of one or more adhesives.

Illustratively, the recessed portions 40 of the inner wall liner 14 are spaced-apart from each other and are also spaced-apart from the upper wall plate 30 and the bottom scuff plate 22, as shown in FIGS. 1 and 3. In other words, a top edge 42 of each recessed portion 40 is spaced-apart from a bottom edge 46 of the upper wall plate 30. Similarly, a bottom edge 44 of each recessed portion 40 is spaced-apart from a top edge 48 of the bottom scuff plate 22. It is within the scope of this disclosure, however, for the upper and lower edges 42, 44 of recessed portions 40 to generally engage the corresponding bottom and top edges 46, 48 of the respective upper and lower plates 30, 22.

In use, the bottom scuff plate 22 operates to prevent the liner sheet 20 from becoming damaged by forklifts, cargo, and/or other items being carried in and out of the trailer. The upper wall plate 30 operates to stiffen or reinforce the upper portion of the liner sheet 20. The bottom scuff plate 22 similarly reinforces the lower portion of the liner sheet 20. Such stiffening of the upper and lower portions of the liner sheet 20 operates to prevent undesirable waves, cupping, and/or buckling of the liner sheet 20 around the recessed portions 40 that may be formed during the manufacturing process of the wall panel 10.

The bottom scuff plate 22 illustratively defines a height 92 of approximately 12 inches while the upper wall plate 30 defines a height 90 of approximately 6 inches. Preferably, the height 90 of the upper wall plate is smaller than the height 92 of the bottom scuff plate. However, it should be understood that the bottom scuff plate 22 and the upper wall plate 30 may define any suitable height such that the bottom scuff plate 22 is able to minimize the damage done to the lower portion of the liner sheet 20 by forklifts and/or cargo and that the upper wall plate 30 is able to sufficiently stiffen the upper portion of the liner sheet 20 in order to prevent or minimize cupping and/or buckling of the liner sheet 20 around the recessed portions 40.

Illustratively, the wall panel 10 is manufactured by first forming the inner wall liner 14. The inner wall liner 14 is formed by extruding the liner sheet 20, extruding the upper wall plate 30, and extruding the bottom scuff plate 22. Once the sheet 20 and plates 30, 22 have been formed, the upper wall plate 30 and the bottom scuff plate 22 are coupled to the respective upper and lower portions of the liner sheet 20. In particular, the plates 30, 22 are fused to the liner sheet 20 in the same or similar manner as that discussed within U.S. Patent Application Publication No. 2009/0278386.

As is discussed in greater detail in the '386 published patent application, the upper wall plate 30 and lower scuff plate 22 may be fused to the liner sheet 20 through a process called glass fiber blooming. In this process, a surface of the scuff plate 22 is heated and a surface of the liner sheet 20 is heated, thereby melting the resin and releasing the glass fibers in each. When the lower scuff plate 22 and the liner sheet 20 are bloomed in this manner and joined together at their bloomed surfaces, reconsolidation of the plastic occurs in order to fuse the components together to create a substantially homogenous end product without the use of additional fasteners or adhesives. In other words, the blooming and fusing process makes the lower scuff plate 22, upper wall plate 30, and liner sheet 20 into a unitary, monolithic, homogenous composition. Further, the fused area is as strong as the parent material of each individual component. The blooming may be accomplished by vibration welding and/or or high frequency welding.

Illustratively, the entire rear surface of the upper wall plate 30 is fused to the upper portion of the liner sheet 20 and the entire rear surface of the lower scuff plate 22 is fused to the lower portion of the liner sheet 20, as shown in FIG. 3, for example. As such, the liner sheet 20 extends a full length of the trailer. However, it should be understood that the use of the blooming and fusing technique may be applied only along a small strip of the lower scuff plate 22 and the lower portion of the liner sheet 20 as well as along only a small strip of the upper wall plate 30 and the upper portion of the liner sheet 20. Thus, a liner sheet 20 may be provided which does not need to extend all the way to the floor and roof of the trailer. Rather, the liner sheet 20 may simply extend to overlap only a portion of each of the lower scuff plate 22 and the upper wall plate 30.

While the blooming and fusing process for coupling the upper wall plate 30 and the lower scuff plate 22 to the liner sheet 20 is described above in order to create a homogenous inner wall liner 14 without the use of mechanical fasteners and/or adhesives, it should be understood that it is within the scope of this disclosure to couple the upper wall plate 30 and the lower scuff plate 22 to the liner sheet 20 suing such mechanical fasters, including, but not limited to rivets, nails, screws, bolts, in addition to or in lieu of adhesives. Further, it is within the scope of this disclosure to form the inner wall liner 14 in one step such that the plates 30, 22 are initially incorporated into the sheet 20 and are molded and formed, or may be extruded, generally simultaneously with the liner sheet 20 such that the top and bottom portions of the finished inner wall liner 14 are thicker than a middle portion of the liner 14. Regardless of the manner in which inner wall liner 14 is formed, the resultant inner wall liner 14 includes an upper portion 80, a lower portion 82, and a middle portion 84. The upper and lower portions 80, 82 have generally the same or similar thickness, 70, 72, while the middle portion 84 where the recessed cavities 40 are formed has a thickness 74 less than that of the upper and middle portions 80, 82 of the inner wall liner 14. It should further be understood that the thicknesses 70, 72 of the upper and lower portions 80, 82 of the inner wall liner 14 may differ from each other, but that the thickness 70, 72 of each of the upper and lower portions 80, 82 remains greater than the thickness 74 of the middle portion 84 of the liner 14.

Once the inner wall liner 14 is made, the inner wall liner 14 is placed into a platform area 50 with the outer sheet 12 such that the inner surface 24 of the inner wall liner 14 is facing upwardly. The outer sheet 12 is positioned below the inner wall liner 14 and is spaced-apart from the inner wall liner 14 by spacers 52. Forms 60 are placed on the inner surface 24 of the liner sheet 20 to create the recessed portions 40. An upper platen, or press, 62 is then lowered to hold the components of the finished wall 10 at a proper thickness. An expanding foam 16 is then added to the interior cavity between the inner wall liner 14 and the outer sheet 12. The expanding foam 16 forces the inner surface 24 of the inner liner sheet 20 to move into full contact with the platen 62, thus leaving the recessed cavity 40 where the forms 60 are positioned. As noted above, the added thickness of the inner wall liner 14 at the upper and bottom portions of the liner 14 as provided by the upper and bottom plates 30, 22 operates to stiffen and strengthen the FRP material in order to prevent waves or buckles in the liner sheet 20 as the liner sheet 20 is forced to bend and conform around the forms 60 by the foam 16. It should be understood that while the particular illustrative process for forming the wall panel 10 is shown in FIG. 2 and described above, the wall panel 10 may be formed using other suitable processes as well.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An inner wall liner of a wall panel of a refrigerated trailer, the inner liner comprising:
   a liner sheet formed of fiber reinforced plastic (FRP);
   a scuff plate formed of FRP, the scuff plate and the liner sheet being fused together such that the scuff plate is coupled to a bottom portion of the liner sheet; and
   an upper wall plate formed of FRP, the upper wall plate and the liner sheet being fused together such that the upper wall plate is coupled to an upper portion of the liner sheet, wherein the liner sheet includes a plurality of cavities formed therein, wherein each cavity is configured to receive a logistics track therein, and wherein each cavity defines an unbroken recessed surface of the liner sheet that is free of apertures prior to installation of the logistics track.

2. The inner wall liner of claim 1, wherein the scuff plate and the upper wall plate are each coupled to an inner surface of the liner sheet.

3. The inner wall liner of claim 1, wherein a thickness of the scuff plate and a thickness of the upper wall plate are substantially the same.

4. The inner wall liner of claim 1, wherein a thickness of the scuff plate is different from a thickness of upper wall plate.

5. The inner wall liner of claim 1, wherein the cavities are formed in an inner surface of the liner sheet, and wherein a top edge of each cavity is spaced-apart from the upper wall plate and a bottom edge of each cavity is spaced-apart from the lower scuff plate.

6. The inner wall liner of claim 1, wherein the scuff plate and upper wall plate are coupled to the inner surface of the liner sheet without the use of fasteners or adhesives.

7. The inner wall liner of claim 6, wherein the inner wall liner is substantially homogenous.

8. An inner wall liner of a wall panel of a refrigerated trailer, the inner liner comprising:
   an upper portion configured to extend along a length of the trailer and having a first thickness;
   a lower portion configured to extend along a length of the trailer and having a second thickness; and
   a middle portion between the upper portion and the lower portion, the middle portion having a third thickness;

wherein the third thickness is less than both the first thickness and the second thickness and wherein the middle portion includes a vertically-extending cavity formed in an inner surface of the middle portion, and wherein the vertically-extending cavity defines an unbroken recessed surface of the middle portion that is free of apertures prior to installation of a logistics track.

9. The inner wall liner of claim 8, wherein the first thickness is generally equal to the second thickness.

10. The inner wall liner of claim 8, wherein the first thickness is different from the second thickness.

11. The inner wall liner of claim 8, wherein the upper portion has a first height smaller than a second height of the lower portion.

12. The inner wall liner of claim 8, wherein the vertically-extending cavity includes an upper edge spaced-apart from the upper portion and a lower edge spaced apart from the lower portion.

13. The inner wall liner of claim 8, wherein the inner wall liner is made from a fiber reinforced plastic (FRP) such that the upper, lower, and middle portions of the inner wall liner are each made from FRP.

14. The inner wall liner of claim 8, wherein an outer surface of the inner wall liner is generally planar and wherein an inner surface of the upper portion is parallel to and spaced-apart from an inner surface of the middle portion.

15. The inner wall liner of claim 8, wherein the inner wall liner is substantially homogenous.

* * * * *